US008880110B2

(12) United States Patent
Klein et al.

(10) Patent No.: US 8,880,110 B2
(45) Date of Patent: Nov. 4, 2014

(54) ENHANCED PUBLIC SAFETY COMMUNICATION SYSTEM

(71) Applicant: Motorola Solutions, Inc., Schaumburg, IL (US)

(72) Inventors: David E. Klein, Davie, FL (US); Scott M. Alazraki, Davie, FL (US); Eric D. Brooks, Coral Springs, FL (US); Steven E. Young, Hillsboro Beach, FL (US); Deborah J. Monks, Palatine, IL (US); Alejandro G. Blanco, Davie, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 13/873,502

(22) Filed: Apr. 30, 2013

(65) Prior Publication Data

US 2013/0310101 A1   Nov. 21, 2013

Related U.S. Application Data

(62) Division of application No. 12/749,194, filed on Mar. 29, 2010, now Pat. No. 8,504,090.

(51) Int. Cl.
| | | |
|---|---|---|
| H04B 7/00 | (2006.01) | |
| G08C 17/00 | (2006.01) | |
| H04J 3/00 | (2006.01) | |
| H04M 11/04 | (2006.01) | |
| H04M 1/00 | (2006.01) | |
| H04W 4/22 | (2009.01) | |
| H04M 3/42 | (2006.01) | |
| H04W 76/00 | (2009.01) | |
| H04W 4/20 | (2009.01) | |
| H04W 84/08 | (2009.01) | |
| H04L 29/08 | (2006.01) | |

(52) U.S. Cl.
CPC ............... *H04W 4/203* (2013.01); *H04W 4/22* (2013.01); *H04M 3/42178* (2013.01); *H04W 76/007* (2013.01); *H04W 4/20* (2013.01); *H04W 84/08* (2013.01); *H04W 4/206* (2013.01); *H04L 67/104* (2013.01)
USPC ................. 455/521; 455/404.2; 455/550.1; 375/260; 370/280; 379/37

(58) Field of Classification Search
CPC .......... G08C 17/00; H04J 3/00; H04M 11/04; H04M 1/04; H04B 7/00
USPC ............. 370/311, 280; 455/404.2, 550.1, 521
See application file for complete search history.

(56) References Cited

U.S. PATENT DOCUMENTS

| | | |
|---|---|---|
| 5,045,839 A | 9/1991 | Ellis et al. |
| 5,179,721 A | 1/1993 | Comroe et al. |

(Continued)

FOREIGN PATENT DOCUMENTS

| | | |
|---|---|---|
| EP | 1768323 A1 | 3/2007 |
| EP | 1768436 A2 | 3/2007 |

(Continued)

OTHER PUBLICATIONS

International Search Report and Written Opinion for International Patent Application No. PCT/US2010/060922 mailed Apr. 19, 2011.

(Continued)

*Primary Examiner* — Bobbak Safaipour
(74) *Attorney, Agent, or Firm* — Steven A. May; Barbara R. Doutre (57) ABSTRACT

A communication system (100) provides collaboration between narrowband communication devices (102) and broadband communication devices (104) operating over different networks. The communication devices (102, 104) are linked to provide peer-to-peer communication that supports the dissemination of public safety information to a public safety personnel user utilizing the devices. Applications within the devices (102, 104) automatically control features amongst the plurality of devices for redundancy of critical information, removal of non-critical information and power management. Context information can also be examined and shared between amongst the devices.

8 Claims, 6 Drawing Sheets

(56) References Cited

U.S. PATENT DOCUMENTS

| | | | |
|---|---|---|---|
| 6,496,508 B1* | 12/2002 | Breuckheimer et al. | 370/397 |
| 7,103,890 B2 | 9/2006 | Bush | |
| 7,382,247 B2 | 6/2008 | Welch et al. | |
| 7,610,354 B2 | 10/2009 | Adams et al. | |
| 7,613,721 B2 | 11/2009 | Horvitz et al. | |
| 7,613,773 B2 | 11/2009 | Watt | |
| 7,617,328 B2 | 11/2009 | Lewis et al. | |
| 7,624,189 B2 | 11/2009 | Bucher | |
| 7,624,421 B2 | 11/2009 | Ozzie et al. | |
| 7,715,794 B2* | 5/2010 | Hulvey | 455/41.2 |
| 7,928,851 B2 | 4/2011 | Stanners et al. | |
| 8,041,305 B2* | 10/2011 | Keller et al. | 455/67.11 |
| 8,112,061 B2 | 2/2012 | Bolin | |
| 8,135,333 B2* | 3/2012 | Thomas et al. | 455/3.01 |
| 8,208,891 B2 | 6/2012 | Jacobs et al. | |
| 8,504,090 B2* | 8/2013 | Klein et al. | 455/521 |
| 8,738,061 B2* | 5/2014 | Klein et al. | 455/521 |
| 2004/0037243 A1 | 2/2004 | Inoue et al. | |
| 2004/0054597 A1 | 3/2004 | Gulliver et al. | |
| 2004/0068551 A1 | 4/2004 | Hymel et al. | |
| 2004/0203978 A1 | 10/2004 | Wong et al. | |
| 2004/0261126 A1 | 12/2004 | Addington et al. | |
| 2005/0207424 A1 | 9/2005 | Hallin | |
| 2005/0265256 A1 | 12/2005 | Delaney | |
| 2007/0211866 A1* | 9/2007 | Sink | 379/37 |
| 2008/0098454 A1 | 4/2008 | Toh | |
| 2009/0160641 A1 | 6/2009 | Stanners et al. | |
| 2009/0207768 A1* | 8/2009 | Wang et al. | 370/311 |
| 2009/0265475 A1 | 10/2009 | Fujita | |
| 2009/0280771 A1* | 11/2009 | Bolin | 455/404.2 |
| 2010/0279647 A1 | 11/2010 | Jacobs et al. | |
| 2010/0303005 A1* | 12/2010 | Gossain et al. | 370/328 |
| 2011/0237217 A1* | 9/2011 | Monks et al. | 455/404.1 |
| 2011/0237287 A1* | 9/2011 | Klein et al. | 455/521 |
| 2011/0274021 A1* | 11/2011 | He et al. | 370/311 |
| 2011/0299478 A1 | 12/2011 | Clark | |
| 2012/0147780 A1* | 6/2012 | Gossain et al. | 370/252 |
| 2013/0107041 A1* | 5/2013 | Norem et al. | 348/143 |
| 2013/0122811 A1* | 5/2013 | Scribano et al. | 455/41.2 |
| 2013/0244714 A1 | 9/2013 | Klein et al. | |

FOREIGN PATENT DOCUMENTS

| | | |
|---|---|---|
| EP | 1928161 A1 | 6/2008 |
| GB | 2423888 A | 9/2006 |
| WO | 2008027750 A2 | 3/2008 |

OTHER PUBLICATIONS

Roy, S. et al., "Capacity Scaling with Multiple Radios and Multiple Channels in wireless Mesh Networks," In Proceedings of the First IEEE Workshop on Wireless Mesh Networks (WiMesh), 2005, pp. 10.
Notice of Allowance mailed Feb. 4, 2013 in U.S. Appl. No. 12/749,194, David E. Klein, filed Mar. 29, 2010.
Final Office Action mailed Jun. 22, 2012 in U.S. Appl. No. 12/749,194, David E. Klein, filed Mar. 29, 2010.
Non-Final Office Action mailed Apr. 30, 2012 in U.S. Appl. No. 12/749,194, David E. Klein, filed Mar. 29, 2010.
International Preliminary Report on Patentability and Written Opinion for International Patent Application No. PCT/US2010/060922 issued on Oct. 2, 2012.
International Search Report and Written Opinion for International Patent Application No. PCT/US2010/060961 mailed Mar. 21, 2011.
International Preliminary Report on Patentability and Written Opinion for International Patent Application No. PCT/US2010/060961 issued on Oct. 2, 2012.
Non-Final Office Action mailed Oct. 25, 2012 in U.S. Appl. No. 12/749,142, David E. Klein, filed Mar. 29, 2010.
International Search Report and Written Opinion for International Patent Application No. PCT/US2010/061214 mailed Apr. 20, 2011.
International Preliminary Report on Patentability and Written Opinion for International Patent Application No. PCT/US2010/061214 issued on Oct. 2, 2012.
Notice of Allowance mailed Dec. 7, 2012 in U.S. Appl. No. 12/749,248, Deborah J. Monks, filed Mar. 29, 2010.
Notice of Allowance mailed Aug. 28, 2012 in U.S. Appl. No. 12/749,248, Deborah J. Monks, filed Mar. 29, 2010.
Non-Final Office Action mailed May 14, 2012 in U.S. Appl. No. 12/749,248, Deborah J. Monks, filed Mar. 29, 2010.
Final Office Action mailed May 21, 2013 in U.S. Appl. No. 12/749,142, David E. Klein, filed Mar. 29, 2010.
Notice of Allowance mailed May 28, 2013 in U.S. Appl. No. 12/749,194, David E. Klein, filed Mar. 29, 2010.
Australian Patent Examination Report No. 1 for Australian Patent Application No. 2010349742 issued on Sep. 27, 2013.
Australian Patent Examination Report No. 2 for Australian Patent Application No. 2010349742 issued on Nov. 8, 2013.
Notice of Allowance mailed Dec. 4, 2013 in U.S. Appl. No. 13/873,522, David E. Klein, filed Apr. 30, 2013.
Non-Final Office Action mailed Dec. 26, 2013 in U.S. Appl. No. 13/873,453, David E. Klein, filed Apr. 30, 2013.
Non-Final Office Action mailed Dec. 20, 2013 in U.S. Appl. No. 13/873,352, David E. Klein, filed Apr. 30, 2013.
Australian Patent Examination Report No. 1 for Australian Patent Application No. 2010349744 issued on Sep. 27, 2013.
European decision of Grant mailed on Mar. 6, 2014 for European Patent Application No. 10798915.4.
Korean Intellectual Propoerty Office (KIPO) Notice of Preliminary Rejection (Non-Final-Translation) in counterpart Korean Patent Application No. 10-2012-7028162—mailed Nov. 29, 2013.
Notice of Allowance mailed Apr. 1, 2014 in U.S. Appl. No. 13/873,522, David E. Klein, filed Apr. 30, 2013.

\* cited by examiner

FIG. 6

ENHANCED PUBLIC SAFETY COMMUNICATION SYSTEM

CROSS REFERENCE TO RELATED APPLICATIONS

This application is a divisional application of U.S. patent application Ser. No. 12/749,194, filed Mar. 29, 2010, and is related to U.S. patent application Ser. No. 13/873,352, U.S. patent application Ser. No. 13/873,453, and U.S. patent application Ser. No. 15/873,522, which applications are filed concurrently herewith and which patent and applications are commonly assigned to Motorola Solutions, Inc. This application further is related to U.S. patent application Ser. No. 12/749,142, filed Mar. 29, 2010, and U.S. Pat. No. 8,380,160, filed Mar. 29, 2010, which applications are commonly assigned to Motorola Solutions, Inc.

FIELD OF THE DISCLOSURE

The present disclosure relates generally to communication systems, and more particularly, to the enhancement of public safety communication systems through linkage with additional non public safety communication devices.

BACKGROUND

Public safety personnel, such as police officers, firefighters, paramedics and the like typically utilize numerous communication devices while working in the field. Public safety communication devices include, for example, mobile radios such as handheld radios and/or vehicular radios along with remote accessories, such as remote microphones, speakers, earpieces, headsets and the like. These primary, mission critical devices and the infrastructure to support their operation are typically realized in the form of a narrowband system operating via a private network governed by a public safety agency.

Public safety personnel often carry additional non-mission critical devices, such as cell phones, personal digital assistants, electronic notepads and the like which operate over a broadband connection. These secondary, non-mission critical devices do not provide a user interface for high stress environments and can become a distraction to the user during a mission critical situation. Particularly in high stress emergency situations, the ability to manage numerous communication devices can become problematic.

Accordingly, there is a need for an improved communication system which will alleviate the aforementioned problems associated with managing numerous communications devices.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components and method steps related to the enhancement of a public safety environment via the addition of well-leveraged non public safety communication devices. An overall communication system is provided which links public safety communication devices with non public safety communication devices via optimized coordination of the devices through information sharing links. The communication system facilitates productivity while enhancing safety measures.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Figure 1:
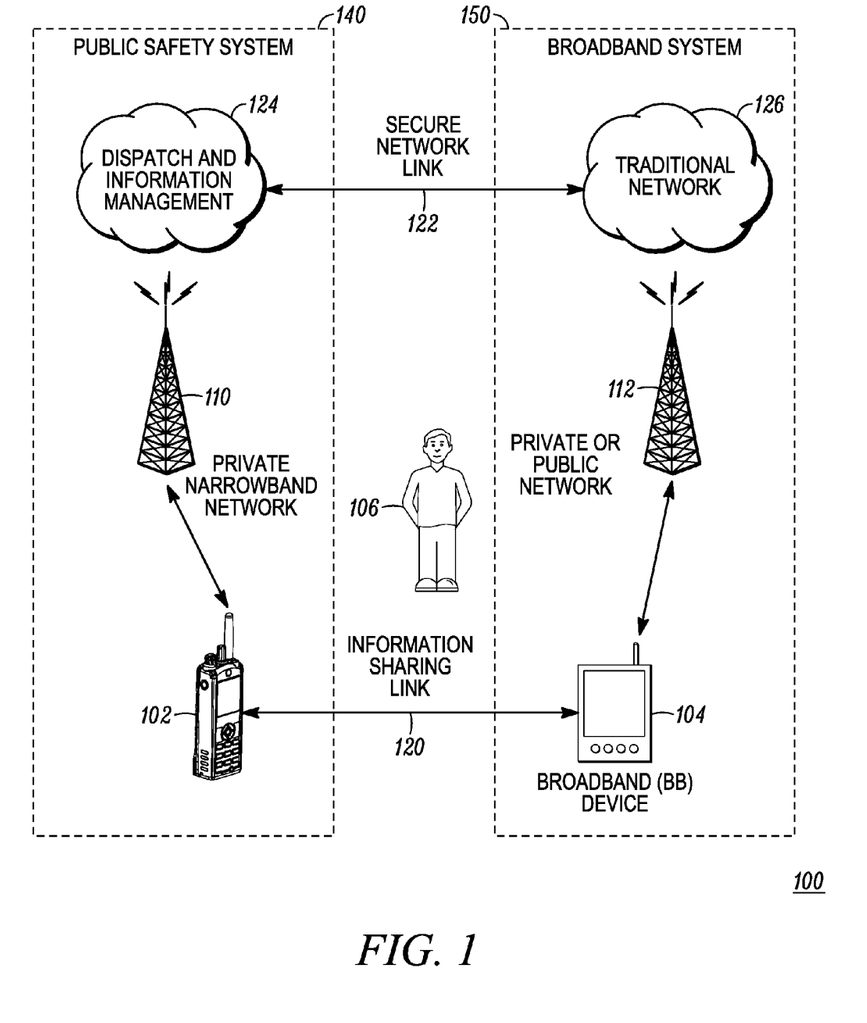
FIG. 1 is a communication system formed and operating in accordance with an embodiment of the invention.

Briefly, referring to FIG. 1 there is shown a communication system 100 formed and operating in accordance with an embodiment of the invention. Communication system 100 comprises a public safety network 140 and a broadband system 150. For the purposes of this application the public safety system 140 provides a private narrowband network 110 governed by a public safety agency. In accordance with the embodiment, the public safety system 140 also comprises a dispatch and information management center 124 and at least one public safety communication device 102 operating over the private narrowband network 110. Broadband system 150 is formed of traditional network infrastructure 126 operating over a private or public network 112 and broadband system 150 also includes at least one broadband communication device 104, which typically operates as a non public safety communication device.

The at least one public safety communication device 102 and the at least one broadband communication device 104 provide a plurality of communication devices for a single user 106 which are preferably handheld devices or devices worn on or about the user's body so as to be under the immediate control of the user. For ease of description and consistency, the plurality of communication devices will be referred to as narrowband communication device 102 and broadband communication device 104. Narrowband communication device 102 comprises a public safety narrowband transceiver and controller with user interface elements comprising for example: microphone, loudspeaker, and display. Examples of narrowband communication device 102 include but are not limited to: hand-held or bodily worn two-way narrowband radios operating under a public safety agency, emergency response rescue groups, and the like. Narrowband communication device 102 further comprises personal area network (PAN) connectivity (examples: Bluetooth, WLAN, Zigbee). Broadband device 104 comprises a broadband radio transceiver, controller and user interface elements such as microphone, speaker, display and the like. Examples of broadband device 104 include but are not limited to: a cell phone, a personal digital assistant (PDA), an environmentally designed device to name a few. Broadband device 104 also includes personal area network (PAN) connectivity (examples: Bluetooth, WLAN, ZigBee).

In accordance with an embodiment, a local network subsystem is integrated within the narrowband communication device 102 and the broadband communication device 104 to provide paired devices operating in a peer-to-peer manner over a master-less communication link 120 using the PAN. The local network subsystem defines a set of communication elements linked together for an interconnected peer to peer (vs. traditional master/slave control) network. The masterless communication link 120 coordinates the management of the plurality of paired communication devices such that the broadband communication device 104 provides additional public safety applications to the user 106.

A secure network link 122 is provided to link the dispatch and information management center 124 of the public safety system 140 to the traditional network 126 of the broadband system 150. The secure network link 122 may be implemented using for example, a public/private long term evolution (LTE) system or other appropriate technology, thereby allowing data and in-field device status between the public safety system 140 and broadband system 150. Once the devices are paired, broadband communication device 104 operates as a partner communication device to narrowband communication device 102 in response to predetermined public safety triggers, which may occur at either device. When operating in a public safety mode of operation, the broadband device will be referred to as the partner device 104.

In the public safety mode of operation, the narrowband communication device 102 operates user interface elements, information management, event management applications, and connectivity with the partner device 104 for sharing contextual information. Examples of contextual information include but are not limited to: radio status, sensor status, ambient sound, location and the like. In accordance with an embodiment, the broadband device 104 when operating as a partner device provides expanded user interface elements, along with information management, event management applications, and connectivity to other local devices.

In accordance with an embodiment, communication system 100 provides interconnectivity between the narrowband communication device 102 and broadband communication device 104 by providing an information sharing link 120 between the devices that coordinated intelligent information sharing to leverage key functions at each device. Communication system 100 provides further interconnectivity between the narrowband communication device 102 and broadband communication device 104 by providing the secure network link 122 between the public safety network 140 and broadband system 150. The interconnectivity is controlled by applications targeted to safety and productivity aspects associated with the public safety user responsibilities and job role.

The interconnectivity of information sharing link 120 controls: local or personal area connectivity (Bluetooth, WLAN, ZigBee, etc), control of a color display, intelligent lighting, time out timers, operating system (OS) level event driven triggers, power management, user interface, event sharing protocols, and public safety wide area voice or integrated voice and data protocols (example: APCO 25 protocol). The interconnectivity of secure network link 122 controls the proper routing of information from the broadband device 104 into the device(s) in the narrowband system using the dispatch and information management center 124. Information sharing link 120 controls interconnectivity via at least one of: general event sharing, coordinated event sharing, coordinated bi-directional event sharing, and both application and event sharing.

In accordance with an embodiment, the communication system 100 defines a set of communication elements linked together for an interconnected peer to peer (vs. traditional master/slave control) network. The linked elements support public safety information and status sharing to facilitate user interaction, increase user awareness, and enhance safety via automation of interaction between narrowband communication device 102 and partner device 104. Examples of a status sharing comprise call mode, emergency mode, intelligent lighting mode, menu mode, scan mode (vs. idle mode) to name a few. The status and the context of the status can be shared via at least four status sharing methods comprising general event sharing, coordinated event sharing, coordinated bi-directional event sharing, and both application and event sharing to be described later. The linked elements operate under a safety net application that controls the delivery of additional safety information to and from the narrowband communication device 102 and partner communication device 104. The safety net application ensures that information is sent to the most appropriate device (or the most appropriate element on a device) and shared in an acceptable format. The additional information facilitates responses that lead to added user safety and work efficiency.

The addition of a partner device or partner devices that is not limited by the resource constraints or bandwidth constraints of a traditional narrowband public safety network allows for parallel operation that increases information between the dispatch and information management center 124 and user 106, for example a field officer. The combined sharing expands traditional capabilities of the narrowband communication device 102 as the two (or more) devices 102, 104 operate in a collaborative manner.

The communication system 100 operating in accordance with embodiments of the invention protects independent device to independent device (narrowband communication device 102 and broadband communication device 104) synchronization of event occurrences to trigger additional local device activity. The "linkage" 120, 122 provides for an equal level of sharing. The sharing and linkage of elements within the communication system 100 allows certain elements, such as for example display, loudspeaker, and keyboard, to not have to be duplicated on multiple devices, thus lowering overall cost of the system without loss of overall functionality.

In accordance with an embodiment, device interconnectivity can be classified under four general categories: general event sharing, coordinated event sharing, coordinated bi-directional event sharing, and both application and event sharing. A discussion of each category is provided below:

General event sharing—One peer device (example: public safety radio) initiates a certain activity and transmits its status or event trigger out to another peer device (example: PDA). The first device processes the event indifferent to the activities of the second device.

Coordinated event sharing—One peer device (example: public safety radio) initiates a certain activity and transmits its status or event trigger out to another peer device (example: PDA). The first device processes the event with the understanding of the capabilities of the peer device so that optimized responses occur. For example, the radio can save battery power if the PDA has an available or better communication transmitter or more battery power.

Coordinated bi-directional event sharing—One peer device (example public safety radio) initiates a certain activity and transmits its status or event trigger out to another peer device (example: PDA). The first device processes the event with the understanding of the capabilities of the peer device so that optimized responses can occur. For example, the radio can save battery power when the PDA has an available or better communication transmitter or more battery power. Additional interaction or trigger event information is shared between devices post event. For example, the interaction between the two devices causes an audible alert to turn off one both devices or trigger a follow-on functional change in the originating device—in this example, the originating device being the radio.

Both Application and event sharing—One peer device (example: radio) initiates a certain activity and transmits both application code and status or event trigger information to another peer device (example: PDA). The radio processes the event while the PDA device executes the received application code, and the PDA processes the event trigger. The device interaction can mirror the prior three interaction scenarios. This approach allows for the initiating device (example: radio) to know exactly how the second peer device (example: PDA) will actually process the events.

Referring back to FIG. 1, in operation the plurality of communication devices 102, 104 each includes a local network subsystem, the local network subsystem automatically assembles the master-less wireless network among the plurality of communication devices 102, 104 using at least one channel for information transfer as indicated by information sharing link 120. In accordance with an embodiment, a plurality of predetermined applications are stored within dispatch and information management center 124 of the narrowband network, accessible by the local network subsystem. Dispatch and information management center 124 stores and downloads predetermined applications to the local network subsystem based on the information transferred amongst the plurality of plurality of communication devices 102, 104. The downloaded application(s) control transmit and receive functionality based on the transferred information content. The previously discussed safety net is created by gathering as much information content as possible from people and devices in the field and utilizing this information for better safety support decisions and increased information deployment to the field.

Figure 2:
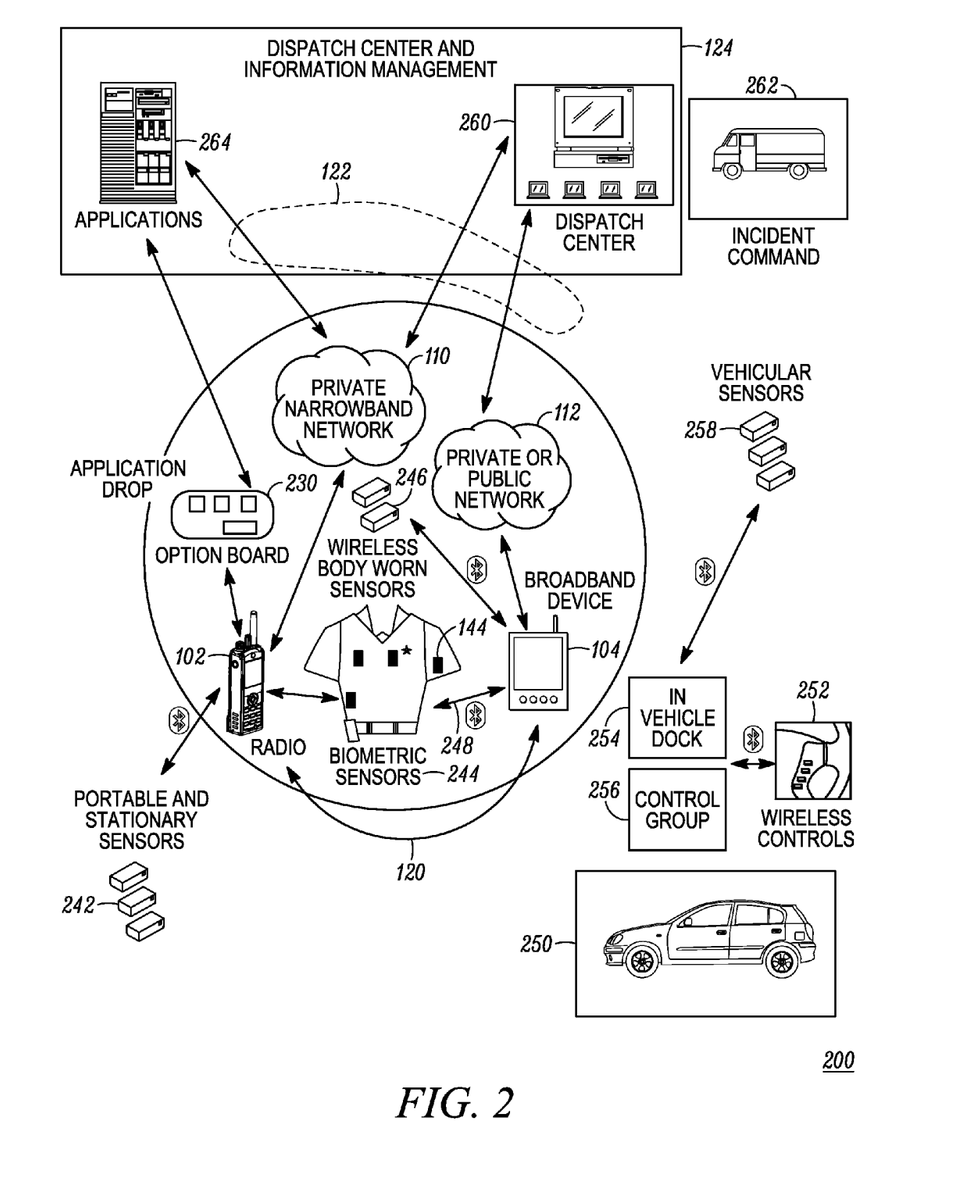
FIG. 2 is a more detailed view of the communication system of FIG. 1 in accordance with an embodiment of the invention.

FIG. 2 shows an example of a more detailed communication system 200 operating in accordance with an embodiment of the invention. Communication system 200 comprises narrowband communication device 102 operating over the private narrowband network 110 and broadband communication device 104 operating over the private network (or public network) 112 as described in FIG. 1. In accordance with an embodiment, information and applications are shared with the narrowband communication device 102 via the public safety system from dispatch and information management center 124 having an information and application database 264. Public safety information collected via the public safety radio device 102 can be shared with the dispatch and information management center 124 via the narrowband network 110. If information can not be shared via the narrowband network 110, the broadband communication device 104 can act as an RF modem to route data via the broadband system 150 over secure network link 122. The information and applications may also be stored locally at an option board 230 and then downloaded to the narrowband communication device 102. The broadband communication device 104 receives the applications over the secure network link 122 and can share the information and applications with narrowband device 102 via a personal area network (PAN) over information sharing link 120.

The applications downloaded to the narrowband communication device 102 provide the collaborative interaction to be used amongst devices. Additional information referred to as context information surrounding the user and devices is also gathered. Context information can be gathered, for example by sensors, such as portable and stationary sensors 242, biometric sensors 244, and/or wireless body worn sensors 246. Context information can also be gathered by location tracking technology embedded within the communication devices 102 and/or 104. The context information can be shared with the dispatch and information management center 124 via narrowband private network 110 or via private/public broadband network 112.

For example, dispatch and information management center 124 may download an application that controls the collection of sensor data at the narrowband communication device 102 for a narrowband device having sensor capability, such as a portable stationary sensors 242 and/or biometric sensors 244. The public safety information is managed by applications on radio 102 and can be mirrored and communicated via broadband devices 104 for redundancy. Broadband communication device 104 can also receive sensory information from the sensors, such as the biometric sensors 244, over a Bluetooth link 248, or Zigbee or other PAN link.

From a vehicular perspective, a vehicle 250 comprises wireless controls 252 and in-vehicle docking station 254 for gathering information from a control group 256 and gathering information from in-vehicle sensors 258. This information is transferred over the private narrowband network 110 for communication to a dispatch center 260 and narrowband communication device 102.

In accordance with an embodiment, the dispatch center 260 is shown communicating with the private narrowband network of the public safety system and the private/public network 112 of the broadband system 150. While the dispatch center 260 normally interfaces with the private narrowband network of the public safety system 140 (as part of dispatch and records management center 124), in this embodiment the downloading of the applications from narrowband communication device 102 to broadband communication device 104 enables the broadband communication device 104 to temporarily communicate with dispatch center 260. Other types of dispatch centers or control centers, such as vehicular incident command center 262, may also provide control services to private or public network 112 of the broadband system 150 and private narrowband network 110 of public safety system 140.

Figure 3:
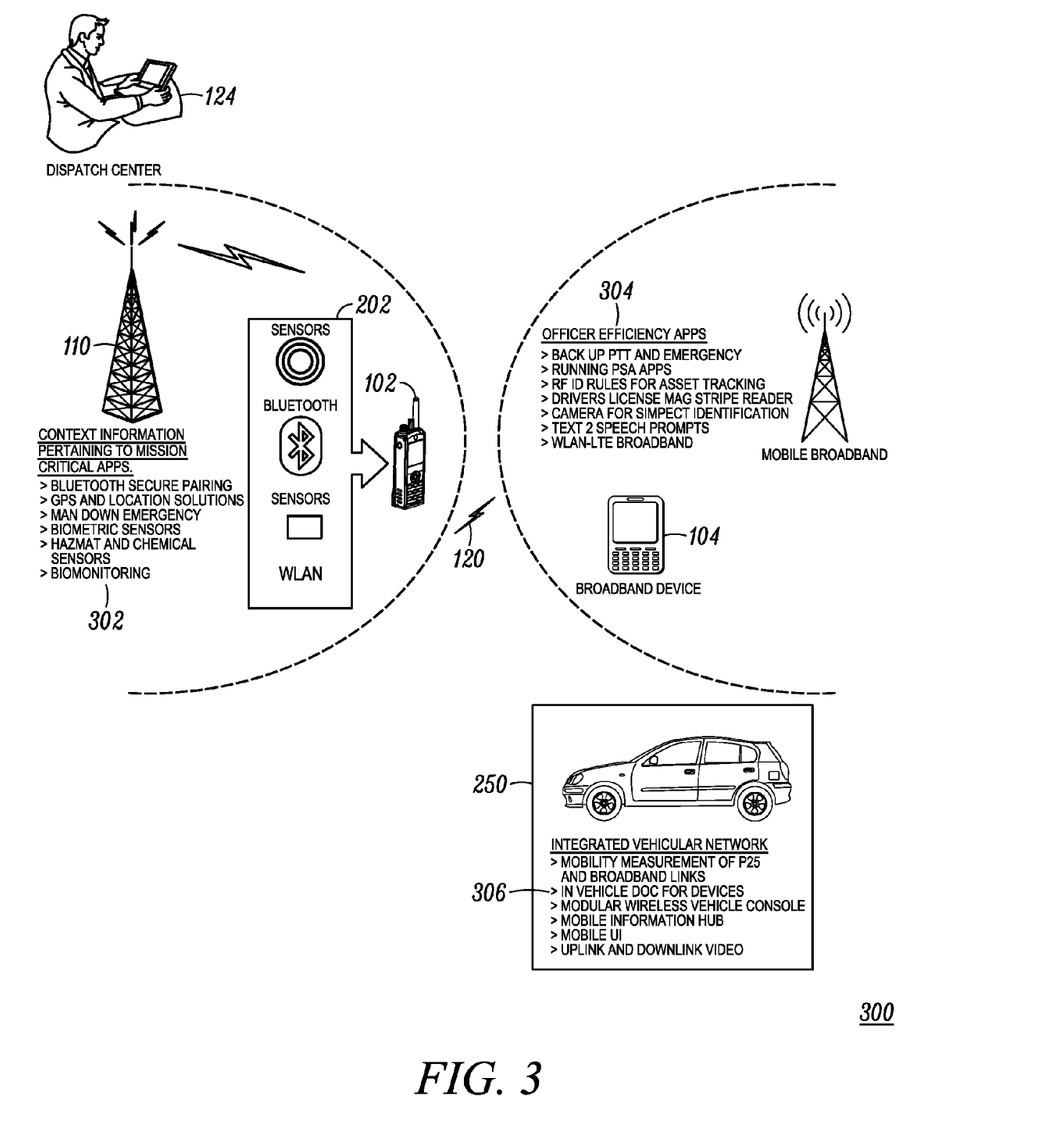
FIG. 3 is a diagram illustrating an example of information and application dissemination amongst communication devices operating within the communication system in accordance with an embodiment of the invention.

FIG. 3 is a diagram illustrating an example of information and application dissemination 300 amongst communication devices operating within the communication system in accordance with an embodiment of the invention. Downloadable information and applications comprise context information pertaining to mission critical applications 302, efficiency applications 304, and vehicular network applications 306. Integrated vehicular network applications 306 operate in conjunction with both applications 302 and 304. Modules integrated within or operating with narrowband communication device 102 include sensors, Bluetooth capability and internet-network capability for internet and network connections. The context information pertaining to mission critical applications 302 comprise for example, Bluetooth secure pairing, GPS and location applications, Man-down emergency applications, biometric sensor, and chemical monitoring.

Efficiency applications 304 comprise, for example, back-up push-to-talk (PTT) and emergency features, running public service announcement (PSA), rules for RF ID tracking, drivers license tag reader, camera capability for facial recognition and identification, text-to-speech prompts and WLAN broadband capability. As mentioned previously, the broadband communication device 104 can operate as an RF modem for PTT audio originating from the narrowband communication device 102.

Examples of the vehicular network applications include but are not limited to: mobility measure of P25 broadband links, in-vehicle docking station for portable devices, modular wireless vehicle console, mobile information HUB, touch screen user interface, and video, such as up-link and down-link video.

The communication systems 100, 200 and application dissemination 300 provide the ability to develop and deploy a broadband communication device 104 to operate as a partner device to the narrowband communication device 102 to increase safety and productivity of the user. The broadband communication device 102 strengthens the safety net and compliments the core radio devices. In-field support is enhanced by the automatic selection of appropriate device for a particular action based on predetermined rules as set out in the downloaded applications.

The communication system allows for the placement of a function on the most reasonable device; however the feature affects all linked devices. Thus, a safety enhancement is provided without additional material costs. For example, utilizing the simplest/fasters device for a given task, a public service personnel worker can better focus on the job at hand. Additionally, by adding the cross-linkage capacity to a higher level of features, the collaborating devices are able to support an ever-changing environment surrounding the user. Operational features can also be escalated based in the radio and radio user's current situation—as determined by the context information.

As an example, consider narrowband communication device 102, such as a two-way radio, going into emergency mode, the partner communication device 104 being altered to the radio mode automatically enables voice recognition. Commands from the user 106 are then received by the partner communication device 104 and routed back to the radio. As such, the radio is not expending battery power or processor power for this voice feature.

Figure 4:
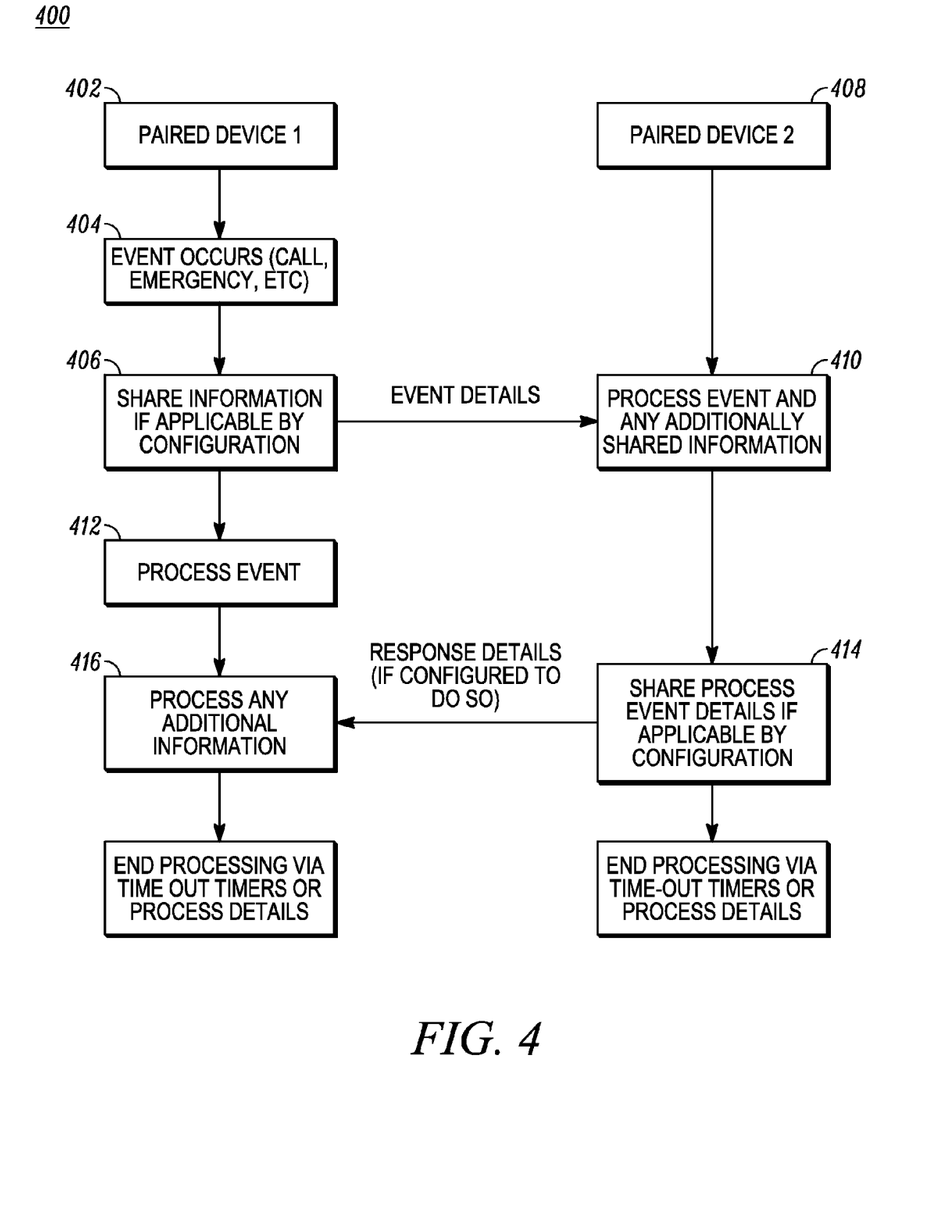
FIG. 4 is a flowchart providing an example of event processing between two communication devices operating in accordance with an embodiment of the invention.

FIG. 4 is a flowchart 400 providing an example of event processing between two paired communication devices operating in accordance with an embodiment of the invention. For this example, the paired devices will be referred to as paired device 1 and paired device 2 402, 408. An event occurs at 404 (for example: a call, an emergency button press, or the like) at paired device 1. Paired device 1, in response to the event, shares 406 pertinent information pertaining to the event details with paired device 2. At 410, paired device 2 processes the event details as well as any other pertinent information supplied by device 1 or collected by device 2 (for example, location or sensory data as configured by mission critical application 302 of FIG. 3). The event information is also processed by paired device 1 at 412. Process event details at device 2 are shared at 414 in conjunction with the configuration application 232. Additional information, if any, (for example: location and sensory data), is also processed by device 1 at 416. Processing of the information at both devices 1 and 2 is ended by time-out timers at 418, 420. Thus, by sharing the processing event in conjunction with additional contextual data, the best device can now be automatically used for certain functions. The sharing occurring between 406/410 and 414/416 can be configured based upon: controlling general event sharing, coordinated event sharing, coordinated bi-directional event sharing, and both application and event sharing as discussed previously.

The process of FIG. 4 provides improved data response efforts shared between paired narrowband and broadband devices. There may also situations where the narrowband communication device 102 can inform the broadband device 104 of an issue, the device 104 informs the radio that will assume certain feature responsibilities; and together the two devices have overcome a fault, error, or environmental issues without user interaction.

Figure 5:
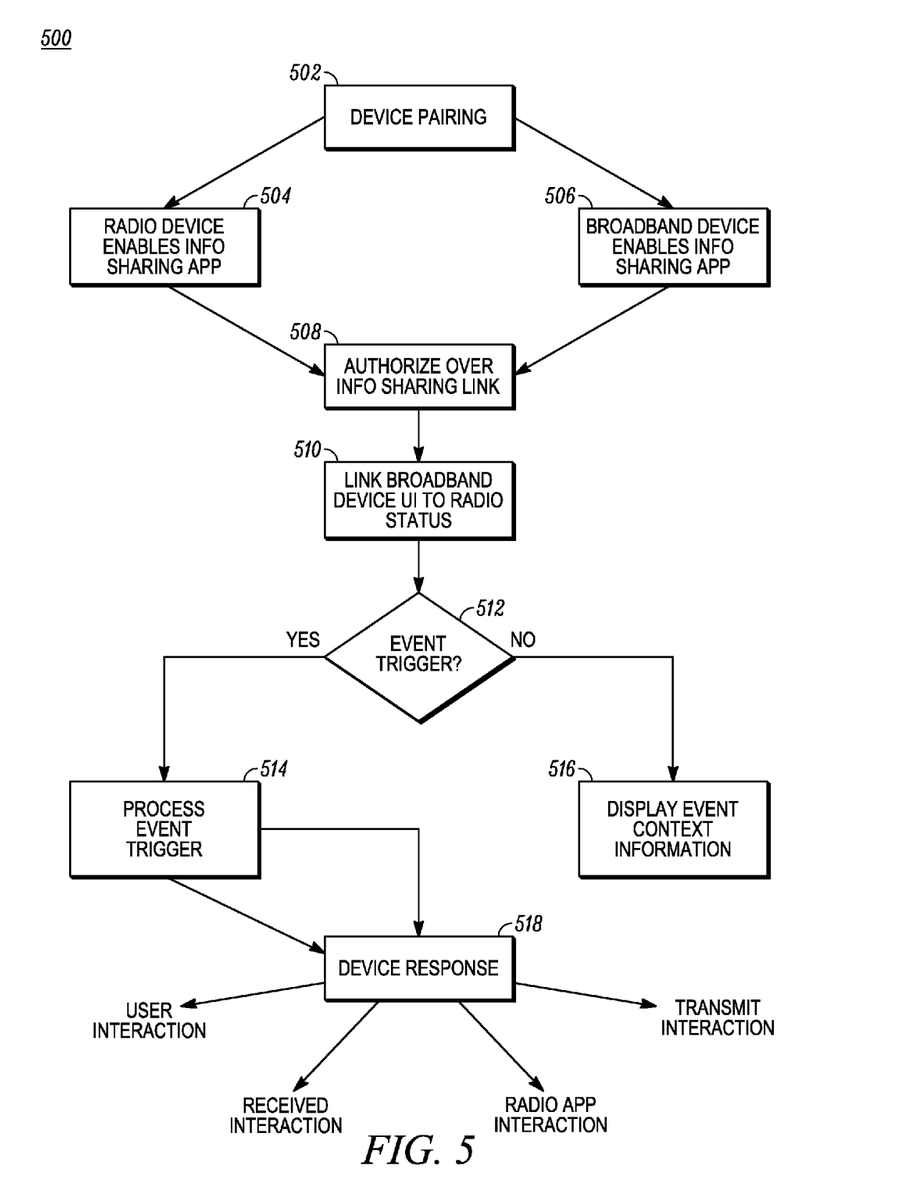
FIG. 5 is a flowchart 500 example of information sharing and event triggering for the interaction of devices operating within the communication system in accordance with an embodiment of the invention.

FIG. 5 is a flowchart 500 example of information sharing and event triggering for the interaction of devices operating within the communication system in accordance with an embodiment of the invention. The interaction begins by device pairing at 502. Device pairing can occur using or in response to manual and known product pairing associated with the type of selected PAN technology. In accordance with this embodiment both the narrowband communication device 102 and broadband device 104 enable their respective information sharing applications at 504 and 506. In accordance with this embodiment an information sharing link is authorized at 508. The basis for authorizing the information sharing link can include backend authentication of a second level paring event, if desired. The authorization 508 creates a baseline for other event activity, such as sharing radio functionality, sharing radio profiles, such as operating modes. In accordance with the embodiment, at 510 the broadband device 104 user interface is linked to the status of narrowband communication device 102.

At 512 a determination is made whether an event trigger occurs (for example an emergency event). If no event is triggered, the broadband device displays event context information pertaining to the narrowband communication device at 516. This allows processing power and battery power to be saved at narrowband communication device 102. The broadband device 104 follows predetermined rules during the local interaction with the narrowband communication device 102 allowing for an expanded user interface for the user. the predetermined rules also include rules for sending and receiving information between the two devices in a collaborative manner.

If an event trigger occurred at 512, then an event application download occurs at 514—the event application download corresponding to the type of event occurring. For example, an emergency application download enables emergency operating features. The emergency application can enable interface features such items as enlarging fonts on a display, intelligent lighting, and matching of narrowband communication device profiles for the emergency application. The event which caused the trigger is processed at 518. The event processing can be controlled though one or more of: user interaction, received interaction (from the partner device 104 or external device), radio application interaction, and transmit interaction (for example to confirm the event).

Figure 6:
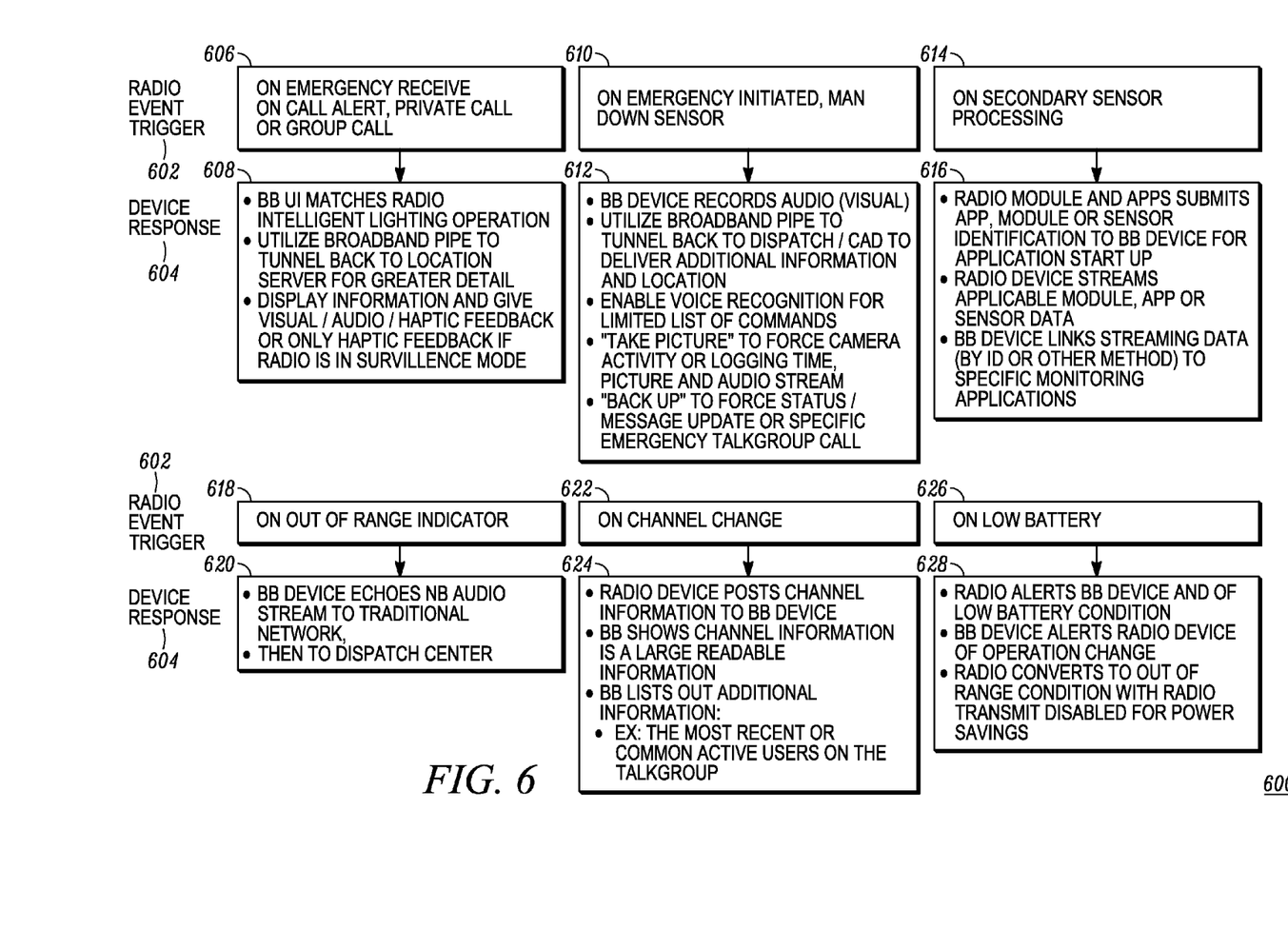
FIG. 6 is table providing examples of a trigger and response for two communication devices operating in accordance with an embodiment of the invention.

The processing of event triggers and responses occurring at 512. 514, 518 can be further exemplified by device triggers and responses shown in FIG. 6 as 602, 604. In FIG. 6, a table 600 provides examples of such device activity. Table 600 shows several examples of radio event triggers 602 received by narrowband communication device 102 and responses 604 by the partnered broadband communication device 104. For example, a radio event trigger 606 of receiving an emergency alert, call alert, private call or group call can result in the partnered broadband device response 608 of: user interface being matched to the radio; intelligent lighting operation; requesting further detail; displaying information; and providing visual, audio, or haptic feedback. A radio event trigger 610 of emergency initiated based on sensor data, such as a man down sensor, can result in partnered broadband device response 612 of: broadband device records in audio and/or visual format; utilization of the broadband connection to deliver additional information and enabling of location determination and voice recognition, "take a picture" to force camera activity with log time, recording an audio stream, sending a back-up request message or emergency group call.

Additional responses may occur at both devices in response to the radio event trigger. For example, a radio event trigger 614 of secondary sensor processing can result in: the narrowband device submitting an application, module, or sensor identification to the broadband device, the narrowband device may stream the sensor data to the broadband device, and the broadband device may link the streaming data to other monitoring applications at 616.

Another event trigger example may be an out of range indicator 618 occurring at the narrowband communication device 102, which results in a response 620 of the broadband device 104 echoing the narrowband device's audio stream into the traditional network 126 where the audio is then sent to the dispatch center 124 via the secure network link 122 allowing for communication when the narrowband device 102 is out of system range.

An event trigger of channel change 622 at the broadband device can result in several responses 624 such as: posting the channel information to the broadband device such that the broadband device shows the channel information in a large font or the broadband device lists out any additional information, such as the most recent or common active users a talkgroup.

A low battery trigger event trigger 626 at the narrowband device can result in a response 628, such as the narrowband device alerting the broadband device of the radio's low battery condition, the broadband device alerting the narrowband device that it is taking over certain operations, and the narrowband device converting to an out of range condition with transmit disabled for power savings.

Independent use cases can still occur with and without the partner device. In either scenario, the user can still accomplish a base level of acceptable functionality on either device (as if there were no linkage). The inclusion of the additional data processing increases user knowledge and understanding via system driven contextual information. Likewise, providing the user's local user contextual information to a dispatcher or secondary group (for example: supervisor) propagates safety information throughout the system to other users and groups.

The broadband communication device can also transmit triggers back to the radio, when the radio is properly configured. This interaction can create a type of remote control unit for the radio where the user can leverage, for example, the voice control and touch screen abilities of the second device to change channels, initiate events (status/message), or enhanced input method for text messaging. These control methods between the 2-to-n devices can be managed via understood languages such as extensible markup language (XML), pre-defined parameter commands, prior known serial commands or other data packet based over the air command protocols.

The communication devices operating in accordance with the embodiments work together for increased self-coordination, adjusting device responses based on surrounding context information, and controlling the which function gets assigned to which device increases user safety. The automation of information delivery to both devices allows for a single communication device, such as a radio or PDA, to be selected to automatically handle certain functions.

EXAMPLES

The following examples describe various embodiments of partnered device interaction for the communication system operating within a public safety environment. For the following examples, the first device is the narrowband device 102 operating within a public safety system and is referred to as a radio, while a second device is the broadband device 104 operating in either a private or public network within a broadband system and is referred to as a personal digital assistant (PDA).

Example #1

Call Received

Radio identifies a peer device and vice versa

Devices associate either with a proprietary or common standards based protocol (example: Bluetooth)

Post association, the devices share a functional list in some understood proprietary protocol (example: XML)

Radio receives a call from a specific user

The two devices can manage this event in three different ways in accordance with the device interaction scenario.

Device Interaction Scenario #1

Radio shares that radio ID with a second device (example: PDA) and processes the call indifferent to the fact that the radio shared the information with the PDA; i.e. radio enables intelligent lights, and any applicable tones Second device (example: PDA) utilizes the caller ID and the fact that the Call Receive event occurred to process additional activity The PDA processes any call receive audible tones and enables the call receive intelligent lighting for some pre-set of time (i.e. time-out-timer)

PDA engages the Customer Enterprise Network (CEN) to acquire additional information about the user associated with the received caller ID (location, current status, skill-set or linked work apparatus)

Device Interaction Scenario #2

Radio shares that radio ID with a second device (example: PDA) and processes the call without audible tones or intelligent lighting to save battery life of the hand held mission critical device. (Additionally, no GPS location update or other events need to occur if the PDA will process the same event details)

Second device (example: PDA) utilizes the caller ID and the fact that the Call Receive event occurred to process additional activity The PDA processes any call receive audible tones and enables the call receive intelligent lighting for some pre-set of time and any GPS location update or other events needed for this event PDA engages the Customer Enterprise Network (CEN) to acquire additional information about the user associated with the received caller ID (location, current status, skill-set or linked work apparatus)

Device Interaction Scenario #3

Radio shares that radio ID with a second device (example: PDA) and processes the call without audible tones or intelligent lighting to save battery life of the hand held mission critical device. (Additionally, no GPS location update or other events need to occur if the PDA will process the same event details)

Second device (example: PDA) utilizes the caller ID and the fact that the Call Receive event occurred to process additional activity The PDA processes any call receive audible tones and enables the call receive intelligent lighting for some pre-set of time and any GPS location update or other events needed for this event PDA engages the Customer Enterprise Network (CEN) to acquire additional information about the user associated with the received caller ID (location, current status, skill-set or linked work apparatus)

The PDA can transmit alert information back to the radio for additional audible or visual alerts if required (example: radio alert occurs if the call was located within a pre-set radius of ¼ mile) or ensure that the radio exits a call alert tone.

An example of this can also been seen as a feedback loop between the radio and PDA such that if the radio receives a call alert and both devices make an audible tone, acknowledging the tone on the radio terminates the tone on the PDA or vice versa.

Device Interaction Scenario #4—Extensions of Prior Device Interaction Scenario Descriptions This scenario could be any of the prior scenarios accept that at the initiation of the radio event (call alert) the radio downloaded specific PDA application code that instructs the PDA how to react to the trigger event and associated caller ID information.

Example #2

Remote Control

Radio identifies a peer device and vice versa

Devices associate either with a proprietary or common standards based protocol (example: Bluetooth)

Post association, the devices share a functional list in some understood proprietary protocol (example: XML)

Second device (example: PDA) offers an application that can drive events on the radio device Channel changes, volume control, call initiation, etc.

The different DIS procedures would vary with the coordination of the radio LEDs or color display showing the channel change or call initiation event.

The call initiated from the PDA would still be controlled on the radio via the time out timers The radio would be capable of communicating its internal status (i.e. result of the call time out timer) back to the PDA Example #3a Radio Emergency Button Radio identifies a peer device and vice versa Devices associate either with a proprietary or common standards based protocol (example: Bluetooth)

Post association, the devices share a functional list in some understood proprietary protocol (example: XML)

When an emergency is initiated on the radio, the device focuses on transmitting the emergency out to the mission critical network and dispatcher The second device (example: PDA) . . .

Switches to a larger vector font on the display

Transmits location update via a second network (example: broadband) so as to not interrupt the radio transmitting the emergency indication Enables voice recognition and video and audio recording can initiate Example #3b Emergency Sensor Response Radio identifies a peer device and vice versa Devices associate either with a proprietary or common standards based protocol (example: Bluetooth)

Post association, the devices share a functional list in some understood proprietary protocol (example: XML)

When an emergency via accelerometer, "Man-Down", or sensor is reported to the second device (example: PDA), the PDA instructs the radio that it needs to enter emergency mode (alarm or call)

The two devices can work in redundancy such that

Both devices transmit emergency via different networks

Both units transmit sensor data over both networks

Both units transmit ambient audio via both networks

The list of functionality can be utilized for redundancy, selectable for power savings, intelligent based upon the amount of information and the capabilities of the different networks Only transmit as little as possible on public safety device due to high transmit power compared to low power cellular or WLAN transmission If out of range, the radio can defer transmission of typical mission critical data (emergency, call request, etc) over to second peer device if it has coverage Depending on inter-network configuration, the second device (PDA) can utilize the radio vo-coder (example: speech coding within the advanced multi-band excitation AMBE standards) to encode PDA recorded voice so that it can be more readily re-inserted into the radio network via a simplified inter-system gateway.

This last section of example #3b is applicable to any of the scenarios as it typifies the ability of the devices to work together for added benefit of:

Power Savings by only utilizing 1 transmitter (lower power) than using both

Appropriate network selection for greater efficiency (not taxing limited mission critical compared to available broadband)

Transmitter power needs compared to available battery can also be a factor

Ability to use elements on other devices for added benefit of size, shape, or battery requirements
Limited electrical elements
camera
additional CPU for MIPS intensive functions
Accelerometers, GPS, or dead reckoning elements
Utilization of form factors that better match specific data input
larger color display
qwerty keypad for data entry to any device
touch screen User Interface for single control entry The examples of various embodiments focus on public safety scenarios by focusing in emergency response details back to the dispatcher. While traditional approaches carry voice, the peer devices of the various embodiments can augment the audio with key dispatcher desirable information being transmitted without affecting the resource constrained public safety network elements.

The communication system provided and operating in accordance with the various embodiments comprises a plurality of mater-less hand held devices operating in a public safety environment providing mutual association, feature/function sharing and managed redundancy. Safety, power management and productivity as well as overall user experience are enhanced though the use of the collaborating devices. The enhanced communication system provides for the ability for greater decision making and automation of decisions in the public safety environment.

Accordingly, there has been provided an enhanced communication system for use in a public safety environment. The automatic coordination of decision ownership amongst public safety and non public safety devices is provided. The automated peer-to-peer networking amongst a user's handheld and bodily worn products provides a seamless communication stream to the user thereby improving safety conditions in hazardous environments. The communication system allows for improved user interface without user interaction to provide for optimized relaying of public safety information over the public safety device and non public safety device.

The communication system operating in accordance with the various embodiments provides a valued connection between a narrowband device, such as a public safety radio, a broadband device, such as a data device, a private narrowband system, and a public or private broadband system. The separation of the two (or more) devices, as opposed to an all in one device, provides redundancy in that the secondary (partnered broadband device) device can fail but the mission critical communications will still continue using the primary narrowband public safety device. Additionally, the use of multiple devices allows for the separation of mission critical information from the detailed contextual information which might otherwise overwhelm the user in the public safety working environment. The collaborative processing and sharing of information allows for triggered inputs to enable changes across the multiple devices for shared device functionality. The communication system provides synchronization of status of the multiple devices to enable cooperative or independent operation based on events and surroundings. The interaction of the devices allows not only for content management but the automatic updating of operational features thereby improving the user experience.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject Those skilled in the art will appreciate that the above recognized advantages and other advantages described herein are merely exemplary and are not meant to be a complete rendering of all of the advantages of the various embodiments of the present invention.

We claim:

1. A communication system, comprising:
a plurality of handheld and bodily worn communications devices comprising public safety communication devices and non public safety communication devices;
a public safety application programmed into each of the public safety communication devices and the non public safety communication devices, the public safety applications placing the public safety communication devices and the non public safety communication devices into a public safety mode of operation in which the non public safety communication devices provide extended public safety communication features to the public safety communication devices;

a peer-to-peer link enabled between the public safety communication devices and the non public safety communication devices, wherein the peer-to-peer link provides automated dissemination and coordination of public safety information amongst the public safety and non public safety communication devices in accordance with the public safety applications; and wherein the public safety applications control transmit functionality, receive functionality and relaying of public safety information to each of the public safety communication devices and the non public safety communication devices in a collaborative manner in response to a trigger comprising a detection, by a communication device of the public safety communication devices and non public safety communication devices, of an emergency event.

2. The communication system of claim 1, wherein relaying of public safety information comprises determining user interface elements of one or more of the public safety communication devices and one or more of the non public safety communication devices for optimum relaying of the public safety information to a user of the one or more public safety communication devices and the one or more non public safety communication devices.

3. The communication system of claim 1, wherein the plurality of communication devices further includes context information gathering devices that gather context information and relay the context information to the public safety communication devices and the non public safety communication devices accordance with the public safety applications.

4. A method of disseminating public safety information, the method comprising:

pairing a user public safety communication device with a user non public safety communication device over a shared information link, wherein the public safety and non public safety communication devices have a same user and wherein the public safety communication device operates in a public safety system and the non public safety communication device operates in a broadband system;

receiving, by the public safety communication device, public safety information over a public safety network of the public safety system;

automatically sharing the public safety information with the non public safety communication device in accordance with a public safety application; and collaborating an exchange of the public safety information between the public safety communication device and the non public safety communication device for presentation to the user.

5. The method of claim 4, wherein collaborating comprises determining user interface elements of the public safety communication device and the non public safety communication device for optimum relaying of the public safety information to the user.

6. The method of claim 5, further comprising:

gathering context information from a public safety environment surrounding the paired public safety communication device and non public safety communication device; and relaying the gathered context information in accordance with the public safety application and determined user interface elements.

7. The communication system of claim 1, wherein the public safety applications control transmit functionality, receive functionality and relaying of public safety information based on predetermined rules maintained by one or more communication devices of the public safety communication devices and non public safety communication devices.

8. The method of claim 4, wherein automatically sharing the public safety information comprises automatically sharing the public safety information based on predetermined rules maintained by one or more communication devices of the public safety communication devices and non public safety communication devices.

* * * * *

UNITED STATES PATENT AND TRADEMARK OFFICE
CERTIFICATE OF CORRECTION

| | | |
|---|---|---|
| PATENT NO. | : 8,880,110 B2 | Page 1 of 1 |
| APPLICATION NO. | : 13/873502 | |
| DATED | : November 4, 2014 | |
| INVENTOR(S) | : David E. Klein et al. | |

It is certified that error appears in the above-identified patent and that said Letters Patent is hereby corrected as shown below:

IN THE TITLE PAGE:

Page 2, item (56), under "OTHER PUBLICATIONS," in Column 2, Line 48, delete "Propoerty" and insert -- Property --, therefor.

IN THE SPECIFICATION:

In Column 1, Line 11, delete "15/873,522," and insert -- 13/873,522, --, therefor.

In Column 1, Line 35, delete "primary," and insert -- primary --, therefor.

In Column 2, Line 12, delete "is table" and insert -- is a table --, therefor.

In Column 6, Lines 27-28, delete "narrowband private" and insert -- private narrowband --, therefor.

In Column 8, Line 53, delete "the" and insert -- The --, therefor.

In Column 12, Line 3, delete "PDA" and insert -- PDA. --, therefor.

In Column 12, Line 23, delete "initiate" and insert -- initiate. --, therefor.

In Column 13, Line 11, delete "entry" and insert -- entry. --, therefor.

In Column 14, Line 55, delete "subject" and insert -- subject. --, therefor.

Signed and Sealed this
Seventeenth Day of May, 2016

Michelle K. Lee
*Director of the United States Patent and Trademark Office*